United States Patent

[11] 3,610,356

| [72] | Inventor | Ernest L. Byar, Jr.<br>1335 N. Detroit St., Los Angeles, Calif. 90046 |
|---|---|---|
| [21] | Appl. No. | 826,228 |
| [22] | Filed | May 20, 1969 |
| [45] | Patented | Oct. 5, 1971 |

[54] SNOW VEHICLE
3 Claims, 8 Drawing Figs.

[52] U.S. Cl. .............................................. 180/5 R, 180/9.24 A, 305/20, 305/27
[51] Int. Cl. .................................................. B62m 27/02
[50] Field of Search ....................................... 180/5, 9.24, 9.24 A; 305/20, 27

[56] References Cited
UNITED STATES PATENTS

| 3,252,533 | 5/1966 | Aeder | 180/5 |
| 3,318,407 | 5/1967 | Deardorff | 180/9.24 |
| 3,362,492 | 1/1968 | Hansen | 180/5 |
| 3,404,745 | 10/1968 | Smieja | 180/9.24 X |
| 3,412,821 | 11/1968 | Humphrey | 180/9.24 X |
| 3,439,763 | 4/1969 | Pederson | 180/5 X |
| 3,480,096 | 11/1969 | Hammitt | 180/5 |

Primary Examiner—Richard J. Johnson
Attorney—Roger A. Marrs

ABSTRACT: A snow vehicle is disclosed herein resembling a motor "bike" having a tubular frame movably supporting an endless belt operable to drivingly engage with a snow-covered ground surface. A motor is carried on the frame beneath a seat and is operably coupled to the belt for driven rotation about shock absorbing idler rollers so that a substantial portion of the belt tread frictionally engages the ground surface. Steering mechanism in the form of a front ski is laterally, swingably mounted on the forward end of the frame by a steering column. The ski is detachably secured to the column and may be replaced by a pneumatic wheel having a strut adapted to be releasably connected to the steering column when the ski is detached.

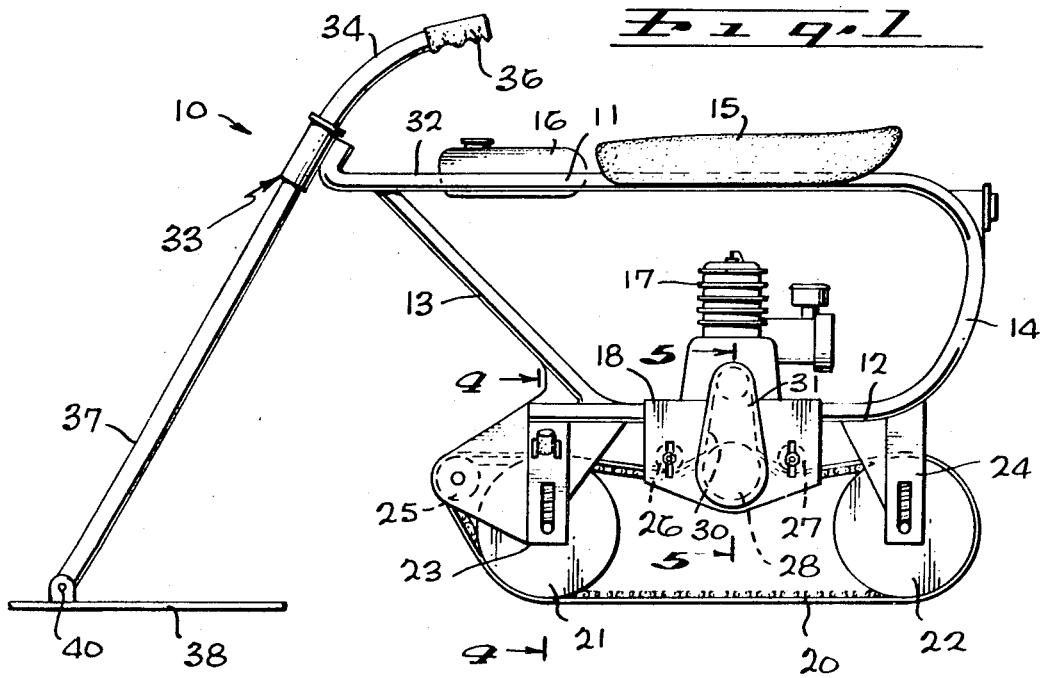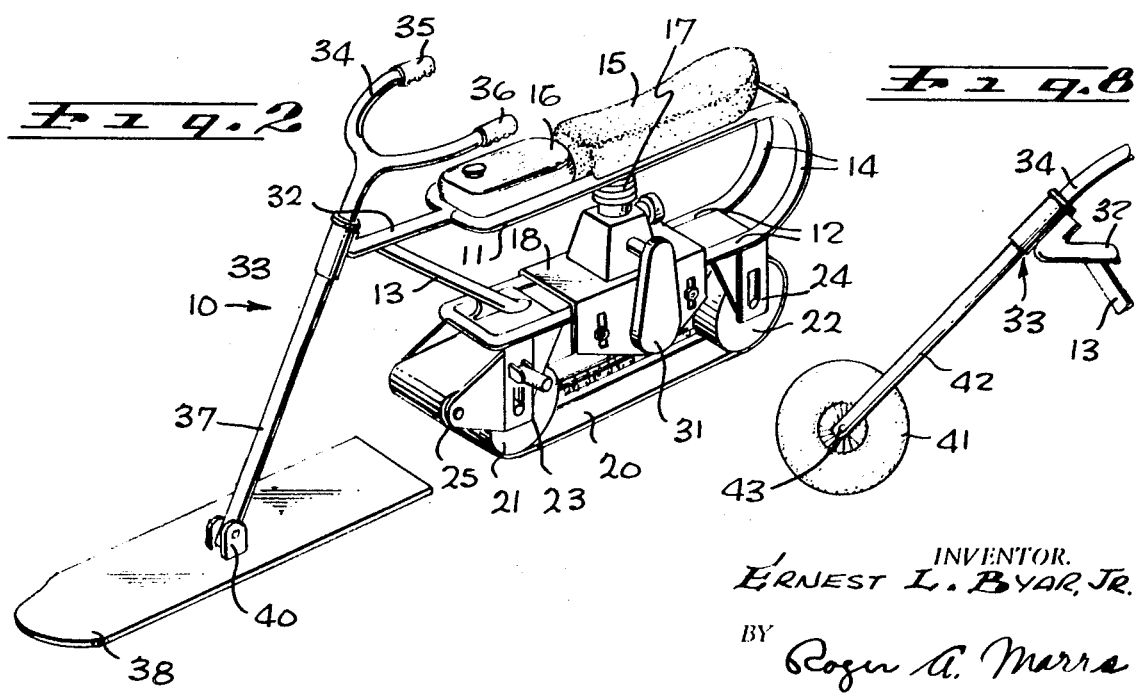

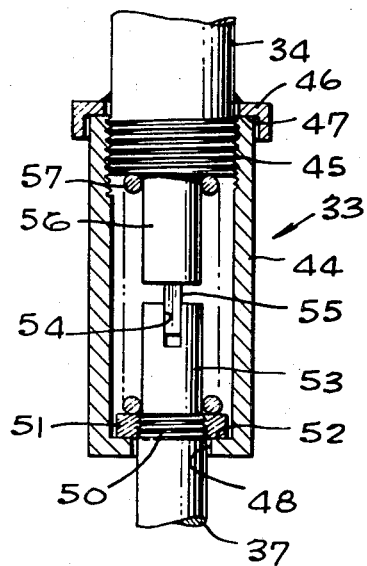
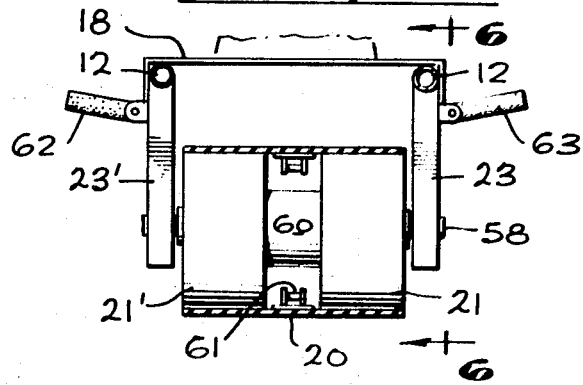
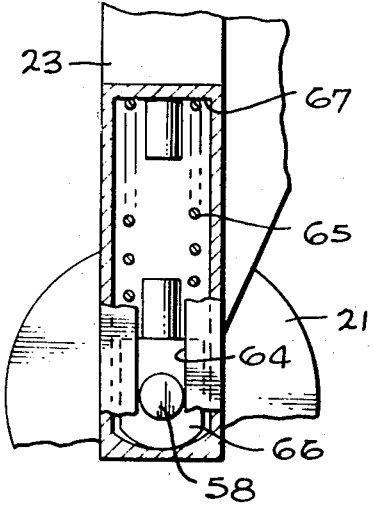
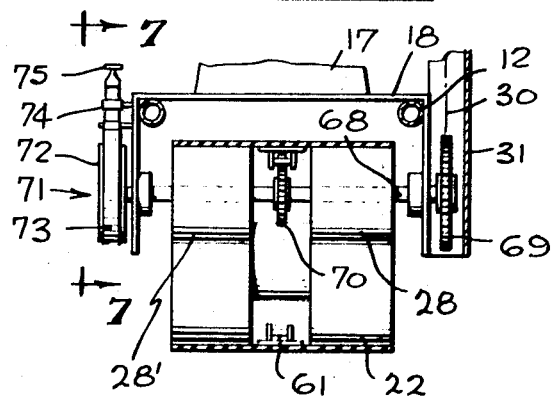
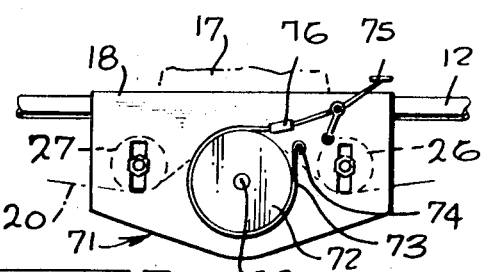

3,610,356

SNOW VEHICLE

BACKGROUND OF THE INVENTION

1. Field of the Invention

This invention relates to personnel transportation vehicles of the motorcycle or bicycle variety and, more particularly, to a novel snow vehicle having a motorized belt drive for vehicle propulsion and an interchangeable ski and wheel steering mechanism.

2. Description of the Prior Art

Conventional biwheeled vehicles have been extensively employed in the past for transporting one or two individuals from one location to another. Usually, such vehicles take the form of motorcycles, motorscooters, or motor "bikes" which are designed and constructed for specific riding purposes. For example, these vehicles are generally placed in predetermined classifications for use in connection with sports activities, competition, trail riding, cross country travel, and so forth, and usually are designed to meet and satisfy the particular needs and requirements for the predetermined classification according to such use. However, such biwheeled vehicles are unsuited for travel over ice or snow-covered terrain.

Recently, attempts have been made to provide vehicles especially suited for travel over ice and snow-covered ground surfaces which take the form of a motorscooter body and frame for housing an engine employed to power an endless belt operating as the primary propulsion means for the vehicle. Generally, a pair of skis are carried forward of the frame and are attached to a supporting column so that the vehicle is steerable over the terrain. The driver and passenger occupy a seat located over the engine and their legs extend forward so that the driver and occupant assume a conventional sedentary position. Other attempts have been made to provide a ski vehicle which is lower in cost of construction which takes the form of a tubular frame having a pair of skis located one behind the other whereby the driver and/or passenger straddle the frame with their legs to ride the vehicle in a fashion somewhat similar to a bicycle. An example of such a vehicle is disclosed in U.S. Pat. Ser. No. 3,438,643. Although such a vehicle is lower in cost than the first vehicle described above, it is not powered and can be employed only for downhill sledding as in conventional skiing.

Therefore, a need has long existed to provide a snow vehicle resembling a motor "bike" on which the driver straddles the frame and yet includes a motor and driving means suitable for powering the vehicle up snow or ice-covered hills and roadways as well as controllably driving the vehicle downhill. Furthermore, the vehicle should have a capability of carrying or towing cargo so that its use may be extended into that of a utility vehicle for transporting goods and cargo over slick and slippery terrain.

SUMMARY OF THE INVENTION

The difficulties and problems encountered with conventional snow vehicles are obviated by the present invention which provides a novel vehicle having a tubular frame for supporting a seat and an engine. The frame further movably carries an endless belt about opposite and spaced-apart shock-absorbing idler rollers and has a friction tread engageable with the snow or ice-covered ground surface for propulsion or driving the vehicle thereover. The frame further includes a steering column for carrying a steering mechanism including a handlebar and either a single front ski or a pneumatic tire which are interchangeable in connection with the steering column. The vehicle further includes suitable speed controls and a braking mechanism so that the driver has complete control over the steering and speed of the vehicle.

Therefore, it is among the primary objects of the present invention to provide a novel snow vehicle having a powered belt for propulsion purposes and which includes a steering mechanism adapted to interchangeably receive a ski or pneumatic wheel.

Another of the present invention is to provide a self-powered snow vehicle having a belt propulsion means movably carried on a frame adapted to be straddled by the driver and/or passengers.

Another object of the present invention is to provide a novel self-powered vehicle intended for use over slick ground surfaces, such as ice or snow-covered terrain, which includes a belt propulsion system, a steering system and a brake mechanism for controlling the speed and direction of vehicle travel.

Yet another object of the present invention is to provide a self-powered snow vehicle adapted to be straddled by the driver which is economical to manufacture, and which includes simplicity of design so that a minimum number of component parts are required for assembly and structural loading.

Yet another object of the present invention is to provide a novel self-propelled snow vehicle resembling a motor "bike" which includes a structural frame on which is mounted steering means, propulsion means and a braking system for controllably operating the vehicle over ice and snow-covered terrain including up-hill as well as downhill travel and with or without cargo hauling capability.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a side elevational view of the novel snow vehicle of the present invention;

FIG. 2 is a perspective view of the snow vehicle shown in FIG. 1;

FIG. 3 is an enlarged sectional view of the steering column employed in the ski vehicle shown in FIG. 1 as taken in the direction of arrows 3—3 thereof;

FIG. 4 is a front elevational view, partly in section, of the self-adjusting shock absorbing means over which the endless belt is trained as taken in the direction of arrows 4—4 of FIG. 1;

FIG. 5 is a sectional view of the belt drive means interconnecting the engine to the movable belt as taken in the direction of arrows 5—5 of FIG. 1;

FIG. 6 is an enlarged view of the shock absorbing means illustrated in FIG. 4 as taken in the direction of arrows 6—6 thereof;

FIG. 7 is a side elevational view of the brake mechanism as taken in the direction of arrows 7—7 of FIG. 5; and FIG. 8 is a side elevational view of a pneumatic wheel carried on a strut detachably mounted on the steering column for interchangeability with the front ski illustrated in FIG. 1 and 2.

DESCRIPTION OF THE PREFERRED EMBODIMENT

Referring to FIGS. 1 and 2, the novel snow vehicle of the present invention is indicated in the general direction of arrow 10 which includes a tubular frame having an upper portion 11, a lower portion 12, a forward portion 13 and a rear arcuate portion 14. The opposite ends of the upper and lower portions 11 and 12 are joined together by means of the forward and rear portions 13 and 14, respectively. The upper, lower and rear portions may comprise a pair of tubular members arranged in fixed parallel spaced-apart relationship while the forward portion 13 may take the form of a single tube or rod. This general construction is more clearly illustrated in FIG. 2 wherein it can be seen that a suitable cushion seat 15 may be disposed between the parallel tube members of the upper frame portion 11 and, a suitable fuel tank 16 may be disposed therebetween forwardly of the seat 15. However, it is to be understood that the fuel tank may be located on the lower portion 12 or elsewhere on the frame, if desired. Also, the frame may take the form of singular tubular construction as opposed to the double parallel tube members, as shown. In either instance, it is suggested that the lower portion 12 be composed of parallel tube members so that a suitable power plant, such as engine 17, can be carried thereon by means of an engine mount 18. Preferably, the engine mount includes a base portion which rests on the parallel members of the lower frame portion 12 and includes downwardly depending flanges from the opposite sides of the plate which project beneath the underside of the lower frame portion.

The propulsion means for the vehicle includes an endless belt 20 trained to travel over forward rollers 21 and rear rollers 22. The front and rear rollers 21 and 22 are arranged in fixed spaced-apart relationship by means of mounting brackets 23 and 24 which are secured at one end to the underside of the lower frame portion 12 so as to downwardly depend from the forward and rear locations thereof. The belt 20 is further trained over a forward idler roller 25 positioned ahead of the forward roller 21 so that the forward end of the belt presents an inclined or rearwardly sloping surface in the direction of vehicle travel. The inclined surface is desirable so that snow, ice, or the like, which is encountered by the belt as the vehicle travels, will be packed at a gradual rate as the vehicle travels forward. Also, because of the inclined surface, the belt will more readily travel over rough or irregular surfaces and terrain.

To maintain the belt taut, a pair of spaced-apart tension rollers 26 and 27 are provided which are rotatably carried between flanges of the engine mount 18 separated by belt stabilizing rollers 28. The top of the circular periphery of a selected one of the rollers 28 extends above the lower peripheral surface of the tension rollers 26 and 27 so that the belt is trained under the tension rollers and over the top of the selected stabilizing roller. The amount of tension applied to the belt is adjustable by selectively raising or lowering the tension rollers so as to apply more or less tension to the belt.

A drive means is provided for interconnecting the drive shaft of engine 17 with a drive gear which may take the form of a drive belt or chain and is indicated by the reference character 30. The bell or chain 30 is enclosed within a housing 31 carried on the flange of mount 18 so as to cover the drive shaft and gear. The diameters of the drive shaft and gear may be suitably designed so as to provide a proper gear or drive ratio for moving the belt 20 at a desired speed having desired power.

The extreme forward end of the upper frame portion 11 includes a single tubular member 32 which is cantilevered forwardly ahead of the drive belt 20 and upper frame portion 12 so as to terminate in connection with a steering column 33 for rotatably supporting a steering mechanism. The steering mechanism includes a handlebar structure 34 which may be of any desirable configuration but which terminates in hand grips 35 and 36 adapted to be grasped by the hands of the driver as he is seated on seat 15. The steering column 33 further rotatably supports a ground engaging member which, as shown in FIGS. 1 and 2, comprises a strut 37 detachably connected at one end to the steering column 33 and pivotally connected at its opposite end to a suitable ski midway between its opposite ends. The strut 37 and ski 38 are adapted to rotate laterally due to connection of the strut to the steering column, and the ski 38 is adapted to pivot fore and aft via pivot connection 40 so that a form of universal action is achieved.

Referring now to FIG. 8, the ski 38 and its attachment strut 37 have been removed from the steering column 33 and a pneumatic wheel 41 and its strut 42 have been interchanged therewith. The strut 42 may take the form of a single strut having an axle 43 for rotatably mounting the wheel 41 or the strut may be of the usual U-shaped variety wherein the wheel 41 is rotatably disposed between the legs of the U shape. By employing the wheel 41, the vehicle of the present invention may be operated on relatively nonslick surfaces and roadways where employment of the ski 38 would not ordinarily permit operation.

Referring now to FIG. 3 in detail, a cross-sectional view of steering column 33 is shown which includes a cylindrical housing 44 having an upper threaded bore end 45 in threadable engagement with the end of the handlebar 34. A collar 46 is carried on the handlebar and includes an annular shoulder 47 surrounding the upper end of the housing 44. The opposite end of the housing 44 includes an opening 48 through which the free end of strut 37 passes into the interior of the housing where its threaded end 50 is engaged with a locknut 51 bearing against the inside surface of a shoulder 52 formed in the housing defining an opening 48. A stud 53 integrally formed on the end of the strut 37 beyond the threads 50 includes a slot 54 adapted to insertably receive a tongue 55 carried on the extreme end of an extension 56 carried on the end of the handlebar 34. The tongue and slot engagement interconnect the handlebar with the strut 37 so that the strut and its ski 38 may be laterally moved to provide steerable control for the vehicle. A feature resides in the provision of an expandable helical spring 57 having its opposite ends surrounding extension 56 and stud 53, respectively, so as to bear against handlebar 34, respectively. This provides a shock-absorbing means for damping applied loads encountered by the ski due to travel over rough terrain.

Although the steering column has been described in connection with strut 37, it is to be understood that strut 37 may be readily removed by rotating the strut so as to cause disengagement between nut 51 and threads 50 whereby the strut may be moved out of opening 48 to disengage tongue 55 with slot 54. Strut 42 of the pneumatic wheel assembly may be inserted through opening 48 and threads similar to threads 50 are provided on the end of the strut 42 for threadable connection with nut 51. The extreme end of strut 42 includes a slot similar to slot 54 so that insertion of tongue 55 may be achieved for interconnection with handlebar 34.

Referring now to FIG. 4 in detail, it can be seen that rollers 21 and 21' are rotatably carried between brackets 23 and 23' by means of axle 58. The rollers include a relatively wide peripheral surface area so as to substantially engage with the inside surface of the belt 20. The rollers 23 and 23' are spaced apart via a spacer 60 so as to accommodate travel of suitable gearing, such as chain teeth 61, carried on the inside of the belt midway between its opposite sides. Also, the brackets 23 and 23' are provided with pivotal foot supports 62 and 63 adapted to function as footrests for the feet of the driver during vehicle travel.

With reference to FIG. 6, an example of a shock-absorbing means for the belt 20 is illustrated in connection with such means carried on bracket 23. The bracket is provided with an elongated slot 64 adapted to conduct travel or passage of the axle 58 in a vertical movement. The vertical displacement or movement of the axle 58 and roller 21 is dampened by an expansion spring 65 bearing against a block 66 carried on the axle 58 and against the upper portion of the bracket 23 represented by shoulder 67. By this means, the rollers 21 and 22 are biased downwardly because of the expanding bias of spring 65; however, this bias is yieldable upon encounter of the belt with uneven terrain so that the axles associated with rollers 21 and 22 will move up through slot 64 against the expanding tension of spring 65. In this manner, shock absorbing characteristics are provided for the comfort of the driver and passenger.

Referring now to FIG. 5 in detail, the engine 17 is illustrated as being mounted on the flat plate of mount 18 and the drive shaft of engine 17 is coupled to a drive wheel 69 by means of belt 30. Drive wheel 69 is rotatably carried on the flanges of the mount 18 by an axle 68 which includes a gear 70 carried midway between its opposite ends. The teeth of gear 70 are in engagement with the gears or chain 61 so that a driving relationship is established whereby rotation of drive wheel 28 and axle 68 is translated into operable driving relationship of the gear 70 with the teeth 61 so as to rotate the belt 20 over the rollers 21 and 22. Stabilizing rollers 28 and 28' are fixedly carried on axle 68 to support the belt and to provide auxiliary driving power to the belt.

The opposite flange from the flange carrying the drive wheel housing 31 is provided with a brake mechanism indicated in the general direction of arrow 71. The brake mechanism 71 is illustrated in FIG. 7 and includes a drum 72 fixed to the end of axle or shaft 68 from its end coupled to drive gear 69 so that the drum rotates therewith. A brake shoe or strap 73 is secured at one end to the flange at numeral 74 while the opposite end of the strap is connected to a foot pedal lever 75 which is pivotally connected to the mount flange. The major length of the strap is trained over a substantial portion of the peripheral surface of the brake drum 72 while a portion of the strap passes through a guide sleeve 76. Upon the application of foot pressure to the pedal 75, the strap is drawn taut about the periphery of the drum 72 so as to effect sufficient frictional engagement to restrict or retard rotation of the drum. This restriction also restricts rotation of the shaft or axle 68 which drives the belt via gear 70 so that the belt speed will be reduced. Upon release of the foot pedal 75, both drum 72 and axle 68 are free to rotate under the driving power of drive wheel 68 via belt 30 connected to the engine drive shaft.

In view of the foregoing, it can be seen that the snow vehicle of the present invention provides a relatively simple and inexpensive device to be manufactured and operated. A feature of the invention resides in the fact that the driver and/or his passenger may sit on seat 15 and straddle the frame with their legs on opposite sides thereof. In this fashion, the vehicle may be driven in a similar manner to a motorcycle or motor "bike." Suitable controls may be provided for regulating motor speed and may take the form of flexible cables extending from the handle grip of the steering mechanism to the applicable portions of the engine 17. Additionally, taillights, headlight and other accessory equipment may also be mounted in appropriate locations on the frame of the vehicle.

Complete control over the operation of the vehicle is afforded the driver via the steering mechanism and the brake as well as by weight shifting of the driver. The steering mechanism provides sufficient directional control while the brake may control speed and stopping functions of the vehicle. Sufficient power is developed through rotation of the belt 20 to drive the vehicle up-hill and to control downhill travel over rough or smooth terrain. Shocks encountered during travel are substantially dampened or absorbed by the shock-absorbing means in column 33 as well as the shock-absorbing means for rollers 21 and 22 carried on each of the brackets.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A snow vehicle resembling a motorbike comprising:
an elongated frame;
front and rear rollers rotatably carried on the forward and rear ends of said frame;
a flexible endless belt trained about said rollers so that a tread portion thereof drivingly engages with the ground surface;
engine means mounted on said frame and operably coupled to said belt to forcibly effect belt rotation;
a steering mechanism movably mounted on the forward end of said frame adapted to control the direction of vehicle travel;
a seat mounted on top of said frame so as to be occupied by a driver having his legs straddled about the sides of said frame;
an idler roller carried on said frame ahead of said forward roller for rotatably supporting said belt so as to provide a rearwardly and downwardly sloping ground engagement belt surface extending between said idler roller and said forward roller;
driving means located midway between said front and rear rollers for connecting said engine to said belt comprising:
a rotatable shaft carried by said frame between the opposing inner surfaces of said belt;
means interconnecting one end of said shaft with said engine for imparting rotary movement to said shaft;
a toothed sprocket gear fixed to said shaft midway between its opposite ends;
gear means carried on the inner surface of said belt in mesh with said toothed gear for driving said belt in response to shaft rotation;
said steering mechanism including a steering column secured to said frame;
a ski positioned ahead of said belt and in axis alignment therewith;
a handlebar rotatably carried in said steering column;
a strut pivotally secured to said ski midway between its opposite ends and detachably engaged with said handlebar in said steering column so as to laterally rotate therewith;
tensioning means carried on said frame and movably engageable with said belt to tension and take up slack therein; and
shock absorbing and damping means mounting said forward and rear rollers to said frame.

2. The invention as defined in claim 1 including
spring means operably carried in said steering column to absorb shocks transmitted thereto via said strut.

3. The invention as defined in claim 1 including a
a brake means comprising:
a brake drum rotatably carried on the end of said shaft opposite to its end carrying said engine interconnection means;
a foot pedal lever pivotally mounted to said frame; and
a strap encircling said drum having one end fixed to said frame and its opposite end connected to said lever whereby forward rotation of said lever draws said strap into frictional engagement with said drum to restrict rotation of said shaft.